(12) United States Patent
Svendsen

US008185579B2

(10) Patent No.: US 8,185,579 B2
(45) Date of Patent: *May 22, 2012

(54) SYSTEM AND METHOD FOR OBTAINING MEDIA CONTENT FOR A PORTABLE MEDIA PLAYER

(75) Inventor: Hugh Svendsen, Chapel Hill, NC (US)

(73) Assignee: Eloy Technology, LLC, Wilmington, DE (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/233,871

(22) Filed: Sep. 19, 2008

(65) Prior Publication Data

US 2009/0055510 A1 Feb. 26, 2009

Related U.S. Application Data

(63) Continuation of application No. 11/403,595, filed on Apr. 13, 2006, now Pat. No. 7,444,388.

(51) Int. Cl.
*G06F 15/16* (2006.01)
*G06F 12/00* (2006.01)

(52) U.S. Cl. ........................................ 709/203; 707/916

(58) Field of Classification Search .......... 709/204–207, 709/217–219, 227–229, 248, 201, 203; 707/200–201, 916, 999.001
See application file for complete search history.

(56) References Cited

U.S. PATENT DOCUMENTS

| | | | |
|---|---|---|---|
| 5,765,028 A | 6/1998 | Gladden | |
| 5,787,470 A | 7/1998 | DeSimone et al. | |
| 5,864,854 A | 1/1999 | Boyle | |
| 5,878,218 A | 3/1999 | Maddalozzo, Jr. et al. | |
| 5,884,031 A | 3/1999 | Ice | |
| 5,944,780 A | 8/1999 | Chase et al. | |
| 5,944,783 A | 8/1999 | Nieten | |
| 5,946,464 A | 8/1999 | Kito et al. | |
| 6,003,030 A | 12/1999 | Kenner et al. | |

(Continued)

FOREIGN PATENT DOCUMENTS

EP 1686497 A2 8/2006

(Continued)

OTHER PUBLICATIONS

"The Mp3/Tag Studio Homepage," http://www.magnusbrading.com/mp3ts/, printed May 17, 2007, 1 page.

(Continued)

*Primary Examiner* — Brendan Higa
(74) *Attorney, Agent, or Firm* — Withrow & Terranova, PLLC

(57) ABSTRACT

A system and method are provided for enabling a portable media player to obtain media content from secondary systems, such as other portable media players, via local wireless communication. In general, the portable media player stores proxy information identifying the media content of a number of media files in the user's media collection rather than the media files themselves. When a secondary system is within a local wireless coverage area of the portable media player, the proxy information for the media files, or a subset thereof, is provided to the secondary system. In response, the secondary system identifies media files stored by the secondary system having media content matching the media content identified by the proxy information. The secondary system then provides a notification of the identified media files to the portable media player, which may then obtain the identified media files from the secondary system.

24 Claims, 7 Drawing Sheets

U.S. PATENT DOCUMENTS

| | | | |
|---|---|---|---|
| 6,012,083 | A | 1/2000 | Savitzky et al. |
| 6,049,821 | A | 4/2000 | Theriault et al. |
| 6,081,840 | A | 6/2000 | Zhao |
| 6,141,759 | A | 10/2000 | Braddy |
| 6,199,107 | B1 | 3/2001 | Dujari |
| 6,212,520 | B1 | 4/2001 | Maruyama et al. |
| 6,216,151 | B1 | 4/2001 | Antoun |
| 6,253,234 | B1 | 6/2001 | Hunt et al. |
| 6,330,602 | B1 | 12/2001 | Law et al. |
| 6,336,115 | B1 | 1/2002 | Tominaga et al. |
| 6,374,289 | B2 | 4/2002 | Delaney et al. |
| 6,490,625 | B1 | 12/2002 | Islam et al. |
| 6,507,727 | B1 | 1/2003 | Henrick |
| 6,633,901 | B1 | 10/2003 | Zuili |
| 6,728,729 | B1* | 4/2004 | Jawa et al. ............................ 1/1 |
| 6,807,641 | B1 | 10/2004 | Ishiguro et al. |
| 6,922,843 | B1 | 7/2005 | Herrington et al. |
| 6,941,275 | B1 | 9/2005 | Swierczek |
| 6,985,588 | B1 | 1/2006 | Glick et al. |
| 6,990,453 | B2 | 1/2006 | Wang et al. |
| 7,046,139 | B2 | 5/2006 | Kuhn et al. |
| 7,069,310 | B1 | 6/2006 | Bartholomew |
| 7,194,555 | B2 | 3/2007 | Scibora |
| 7,203,711 | B2 | 4/2007 | Borden et al. |
| 7,277,766 | B1 | 10/2007 | Khan et al. |
| 7,310,629 | B1 | 12/2007 | Mendelson et al. |
| 7,668,821 | B1 | 2/2010 | Donsbach et al. |
| 7,765,192 | B2 | 7/2010 | Svendsen |
| 7,860,837 | B2 | 12/2010 | Ali et al. |
| 8,060,477 | B1 | 11/2011 | Svendsen |
| 2001/0051996 | A1 | 12/2001 | Cooper et al. |
| 2002/0025141 | A1* | 2/2002 | Matsumoto et al. ............ 386/96 |
| 2002/0033844 | A1 | 3/2002 | Levy et al. |
| 2002/0052885 | A1 | 5/2002 | Levy |
| 2002/0065074 | A1 | 5/2002 | Cohn et al. |
| 2002/0100054 | A1 | 7/2002 | Feinberg et al. |
| 2002/0124252 | A1 | 9/2002 | Schaefer et al. |
| 2002/0152318 | A1 | 10/2002 | Menon et al. |
| 2002/0156546 | A1 | 10/2002 | Ramaswamy |
| 2002/0157002 | A1 | 10/2002 | Messerges et al. |
| 2002/0194264 | A1* | 12/2002 | Uchiyama et al. ............ 709/203 |
| 2003/0023427 | A1 | 1/2003 | Cassin et al. |
| 2003/0045265 | A1 | 3/2003 | Huang et al. |
| 2003/0055657 | A1 | 3/2003 | Yoshida et al. |
| 2003/0206717 | A1 | 11/2003 | Yogeshwar et al. |
| 2004/0034441 | A1 | 2/2004 | Eaton et al. |
| 2004/0057348 | A1* | 3/2004 | Shteyn et al. .............. 369/30.38 |
| 2004/0064500 | A1* | 4/2004 | Kolar et al. ................... 709/202 |
| 2004/0088348 | A1 | 5/2004 | Yeager et al. |
| 2004/0096110 | A1 | 5/2004 | Yogeshwar et al. |
| 2004/0117828 | A1 | 6/2004 | Parker et al. |
| 2004/0158865 | A1 | 8/2004 | Kubler et al. |
| 2004/0224638 | A1 | 11/2004 | Fadell et al. |
| 2005/0010616 | A1 | 1/2005 | Burks |
| 2005/0015713 | A1 | 1/2005 | Plastina et al. |
| 2005/0021420 | A1 | 1/2005 | Michelitsch et al. |
| 2005/0026559 | A1 | 2/2005 | Khedouri |
| 2005/0108303 | A1 | 5/2005 | Carter |
| 2005/0119977 | A1* | 6/2005 | Raciborski ...................... 705/59 |
| 2005/0154764 | A1 | 7/2005 | Riegler et al. |
| 2005/0155052 | A1 | 7/2005 | Ostrowska et al. |
| 2005/0216855 | A1* | 9/2005 | Kopra et al. .................. 715/767 |
| 2005/0251576 | A1 | 11/2005 | Weel |
| 2005/0273825 | A1 | 12/2005 | Eldeeb |
| 2006/0004640 | A1 | 1/2006 | Swierczek |
| 2006/0008256 | A1* | 1/2006 | Khedouri et al. ............ 386/124 |
| 2006/0087926 | A1 | 4/2006 | Hwang |
| 2006/0130119 | A1 | 6/2006 | Candelore et al. |
| 2006/0159109 | A1 | 7/2006 | Lamkin et al. |
| 2006/0161635 | A1 | 7/2006 | Lamkin et al. |
| 2006/0168351 | A1 | 7/2006 | Ng et al. |
| 2006/0195462 | A1* | 8/2006 | Rogers ......................... 707/100 |
| 2006/0195515 | A1 | 8/2006 | Beaupre et al. |
| 2006/0206582 | A1* | 9/2006 | Finn .............................. 709/217 |
| 2006/0221257 | A1 | 10/2006 | Nakayama |
| 2007/0005990 | A1 | 1/2007 | Sathish |
| 2007/0008280 | A1 | 1/2007 | Ullmann |
| 2007/0055754 | A1 | 3/2007 | Robbin et al. |
| 2007/0067794 | A1 | 3/2007 | Russell et al. |
| 2007/0130207 | A1 | 6/2007 | Pate et al. |
| 2007/0168540 | A1* | 7/2007 | Hansson ....................... 709/231 |
| 2007/0198746 | A1 | 8/2007 | Myllyla et al. |
| 2007/0245398 | A1 | 10/2007 | Roden |
| 2008/0010372 | A1 | 1/2008 | Khedouri et al. |
| 2008/0086750 | A1 | 4/2008 | Yasrebi et al. |
| 2008/0104111 | A1 | 5/2008 | Slaney |
| 2008/0162655 | A1 | 7/2008 | Khedouri et al. |
| 2008/0183794 | A1 | 7/2008 | Georgis et al. |
| 2009/0077084 | A1 | 3/2009 | Svendsen |
| 2011/0225175 | A1* | 9/2011 | Asaka et al. .................. 707/752 |

FOREIGN PATENT DOCUMENTS

| | | | |
|---|---|---|---|
| GB | 2294132 | A | 4/1996 |
| GB | 2372850 | A | 9/2002 |
| WO | 00/54462 | | 9/2000 |
| WO | 01/02905 | A1 | 1/2001 |
| WO | 2004/043064 | A1 | 5/2004 |
| WO | 2006/093839 | A2 | 9/2006 |

OTHER PUBLICATIONS

"Tag&Rename—easy to use mp3 tag editor," http://www.softpointer.com/tr.htm, copyright 1999-2007 Softpointer Inc, printed May 17, 2007, 2 pages.

"MUSICSTRANDS.COM Because Music is Social," copyright 2006 MusicStrands, Inc., 2 pages.

"Start listening with Last.fm . . . and get a station with music you'll like," http://www.last.fm/, copyright 2002-2007 Last.fm Ltd., printed Oct. 4, 2007, 2 pages.

"Listen with Last.fm and fuel the social music revolution," http://www.last.fm/tour/, copyright 2002-2007 Last.fm Ltd., printed Oct. 4, 2007, 1 page.

"Share your music taste," http://www.last.fm/tour/share/, copyright 2002-2007 Last.fm Ltd., printed Oct. 4, 2007, 1 page.

"Discover music with a little help from the fans," http://www.last.fm/tour/discover/, copyright 2002-2007 Last.fm Ltd., printed Oct. 4, 2007, 1 page.

International Search Report for PCT/US08/54347 mailed Jul. 22, 2008.

"Apple—iTunes—Music Store," http://web.archive.org/web/20050305041722/www.apple.com/itunes/store/, copyright 2005 Apple Computer, Inc., printed Dec. 7, 2008, 3 pages.

Lucas Gonze, "A survey of playlist formats," http://gonze.com/playlists/playlist-format-survey.html, Nov. 17, 2003, printed Dec. 7, 2008, 22 pages.

"Acoustic fingerprint," http://en.wikipedia.org/wiki/Acoustic_fingerprint, printed Jul. 3, 2009, 3 pages.

Tony Bowden, "Understanding Nothing, The Music Database: Prehistory," Jun. 25, 2002, http://nothing.tmtm.com/archives/tag/mdb/page/2, printed Jul. 3, 2009, 6 pages.

Rocco Caputo, "CDDB.pm," http://www.mathematik.uni-ulm.de/help/per15/doc-5.005_CDDB.html, copyright 1998 Rocco Caputo, printed Jul. 3, 2009, 6 pages.

ABSTRACT, Keller, A. M. et al., "A predicate-based caching scheme for client-server database architectures," The VLDB Journal, vol. 5, No. 1, Jan. 1, 1996, pp. 35-47, 2 pages.

Keller A.M. et al., "A Predicate-based Caching Scheme for Client-Server Database Architectures," The VLDB Journal, vol. 5, No. 1, Jan. 1, 1996, received Nov. 1994, copyright 1996, Springer-Verlag, pp. 35-47, 13 pages.

"Mercora—Music Search and Internet Radio Network," at <http://www.mercora.com/overview.asp>, copyright 2004-2006, Mercora, Inc., printed Aug. 8, 2006, 1 page.

"NoviiMedia/Palm OS Solutions/NoviiRemote Blaster for Treo 650," at <http://www.novii.tv/palm/blaster/>, copyright 2000-2009, Novii, printed Oct. 16, 2009, 4 pages.

"NoviiMedia/Palm OS Solutions/NoviiRemote Deluxe for Palm OS," at <http://www.novii.tv/palm/deluxe/>, copyright 2000-2009, Novii, printed Oct. 16, 2009, 2 pages.

"Full Version: iTunes 4.0.1 available via software update," at <http://www.techsurvivors.net/forums/lofiversion/index.php?t2235.html>, copyright 2001-2012, Invision Power Services, Inc., posts dated May 27-31, 2003, 5 pages.

"iTunes 4: Tips and Tricks," at <http://docs.info.apple.com/article.html?artnum=93120>, last modified Sep. 18, 2003, Apple, Inc., printed Mar. 15, 2012, 1 page.

"iTunes 4: What's New," at <http://docs.info.apple.com/article.html?artnum=93141>, last modified Jun. 23, 2004, Apple, Inc., printed Mar. 29, 2012, 1 page.

"iTunes Tracker," at <http://www.macupdate.com/app/mac/12088/itunes-tracker>, date unknown but postings dated as early as Jun. 23, 2003, copyright 2012, MacUpdate LLC, printed Mar. 15, 2012, 2 pages.

Nilsson, M., "ID3 tag version 2.3.0," at <http://web.archive.org/web/20050305120402/http://www.id3.org/idev2.3.0.txt>, Feb. 3, 1999, printed Mar. 16, 2012, 32 pages.

"PKZIP 2.50 for DOS User's Manual," at <http://l.zammit.free.fr/pkzip/MANUAL.TXT>, copyright 1989-1999, PKWARE Inc., printed Mar. 16, 2012, 68 pages.

* cited by examiner

SYSTEM AND METHOD FOR OBTAINING MEDIA CONTENT FOR A PORTABLE MEDIA PLAYER

RELATED APPLICATIONS

The present application is a continuation of U.S. application Ser. No. 11/403,595 entitled "SYSTEM AND METHOD FOR OBTAINING MEDIA CONTENT FOR A PORTABLE MEDIA PLAYER", filed Apr. 13, 2006, which is hereby incorporated by reference in its entirety.

FIELD OF THE INVENTION

The present invention relates to a system and method for obtaining media content for a portable media player, and more specifically relates to a system and method enabling a portable media player to obtain media content corresponding to media content in the user's media collection from secondary systems.

BACKGROUND OF THE INVENTION

The past few years have given rise to a proliferation of portable media players, such as Apple's iPod devices and MP3 players. In order to transfer media content, such as songs, to the portable media players, the portable media players are typically attached to associated desktop computers, and song files are transferred from the desktop computer to the portable media player. The storage space available on the portable media players varies significantly. For example, some media players may have 512 megabytes (MB) of storage space while others may have 60 gigabytes (GB) of storage space. In comparison, the media collections of the users, which are stored on the associated desktop computers, may require anywhere from a few hundred megabytes to several hundred gigabytes of storage space. Thus, it is not uncommon for a user's media collection stored on his or her desktop computer to be larger than the storage capacity of the user's portable media player. As such, the user must typically select a subset of his or her media collection to store on his or her portable media player at any given time.

The issue that results from the above scenario is that the user must reconnect the user's portable media player to his or her desktop computer each time media content from his or her media collection is desired. If the user is away from his or her desktop computer, which is typically the case, the user is unable to acquire media content from his or her media collection. Thus, there is a need for a system and method enabling a portable media player to obtain media content from the user's media collection without reconnecting the portable media player to an associated user system, such as a desktop computer, storing the user's media collection.

SUMMARY OF THE INVENTION

The present invention provides a system and method enabling a portable media player to obtain media content from secondary systems, such as other portable media players, via local wireless communication. In general, the portable media player stores proxy information identifying the media content of a number of media files in the user's media collection rather than the media files themselves. The portable media player is equipped with a local wireless interface. When a secondary system, such as another portable media player, is within a local wireless coverage area of the portable media player, the proxy information for the media files, or a subset thereof, is provided to the secondary system. In response, the secondary system identifies media files stored by the secondary system having media content matching the media content identified by the proxy information. The secondary system then provides a notification of the identified media files to the portable media player, which may then obtain the identified media files from the secondary system. As a result, the portable media player is enabled to obtain media content corresponding to media content from the user's media collection without access to the associated user system storing the user's media collection.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method enabling a portable media player to obtain media content from secondary systems, such as other portable media players, via local wireless communication. In general, the portable media player stores proxy information identifying the media content of a number of media files in the user's media collection rather than the media files themselves. The portable media player is equipped with a local wireless interface. When a secondary system, such as another portable media player, is within a local wireless coverage area of the portable media player, the proxy information for the media files, or a subset thereof, is provided to the secondary system. In response, the secondary system identifies media files stored by the secondary system having media content matching the media content identified by the proxy information. The secondary system then provides a notification of the identified media files to the portable media player, which may then obtain the identified media files from the secondary system. As a result, the portable media player is enabled to obtain media content corresponding to media content from the user's media collection without access to the associated user system storing the user's media collection.

Figure 1:
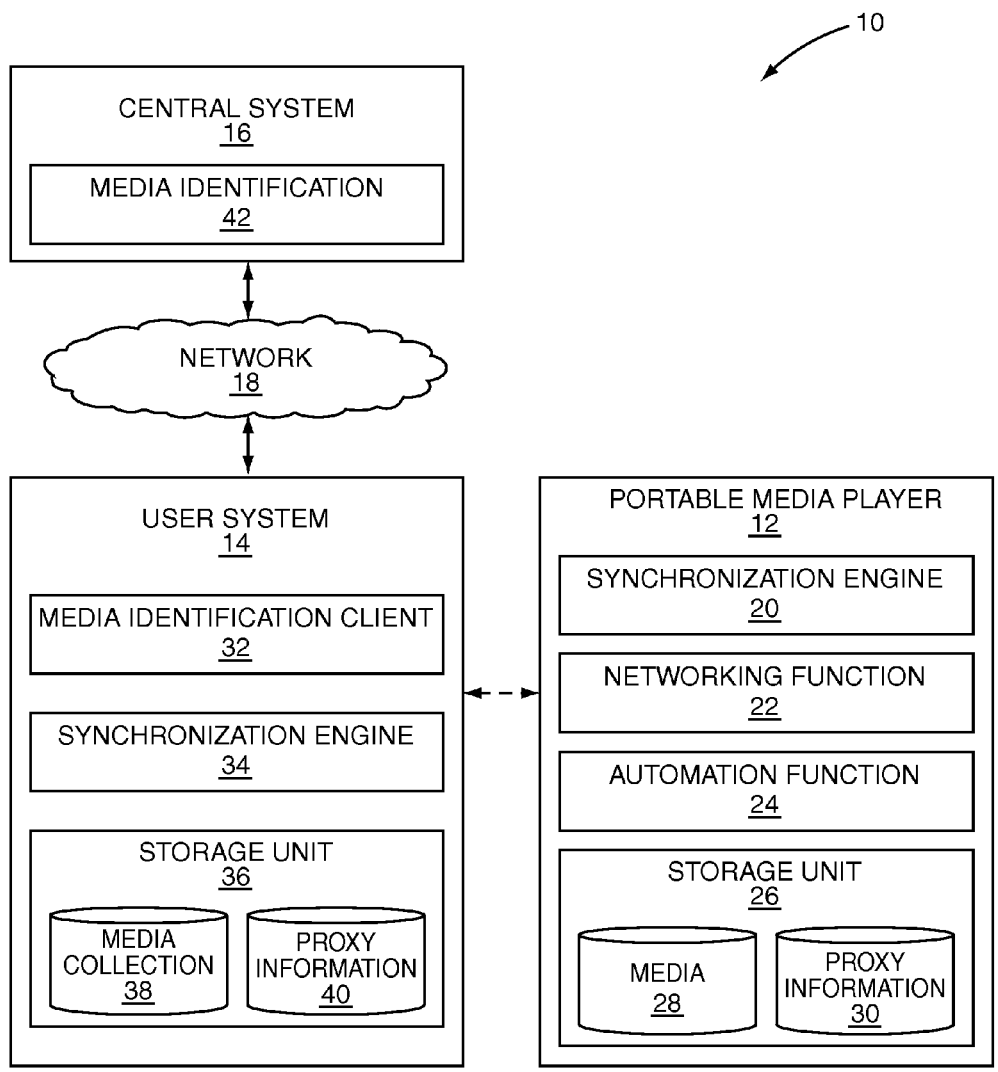
FIG. 1 illustrates a system enabling a portable media player to obtain media content corresponding to media content in the user's media collection from secondary systems according to one embodiment of the present invention.

FIG. 1 illustrates a system 10 enabling a portable media player 12 to obtain media content corresponding to media content in the user's media collection from secondary systems according to one embodiment of the present invention. In general, the system 10 includes the portable media player 12, an associated user system 14, and a central system 16. The associated user system 14 is communicatively coupled to the central system 16 via a network 18, which is preferably a distributed, public access network, such as the Internet. The portable media player 12 may be any portable device having media player capabilities. For example, the portable media player 12 may be an Apple iPod, MP3 player, or the like, or a mobile terminal such as a mobile telephone, Personal Digital Assistant (PDA), or the like having media player capabilities. The portable media player 12 may be enabled to play audio content such as songs, video content such as movies or television programs, or both audio and video content.

The portable media player 12 generally includes a synchronization engine 20, a networking function 22, an automation function 24, and a storage unit 26. The synchronization engine 20 may be implemented in hardware, software, or a combination of hardware and software and operates to interact with the user system 14 when the portable media player 12 is communicatively coupled, or docked, to the user system 14 to perform a synchronization process. The portable media player 12 may be docked to the user system 14 using either a wired interface or local wireless interface. For example, a wired interface may be a Universal Serial Bus (USB) or Firewire interface. A local wireless interface may be a wireless interface operating according to the Bluetooth standard, the Zigbee standard, one of the suite of IEEE 802.11 standards, or the like. As discussed below, during the synchronization process, media files may be transferred from the user system 14 to the portable media player 12, proxy information may be transferred from the user system 14 to the portable media player 12, or both media files and proxy information may be transferred from the user system 14 to the portable media player 12.

The networking function 22 may be implemented in hardware, software, or a combination of hardware and software and operates to establish local wireless communication with secondary systems within a local wireless coverage area of the portable media player 12, as discussed below in more detail. In general, the networking function 22 operates to establish an ad-hoc local wireless network with secondary devices within a local wireless coverage area of the portable media player 12.

The automation function 24 may be implemented in hardware, software, or a combination of hardware and software. In general, the automation function 24 operates to automate the process of obtaining media files from secondary systems, such as other portable media players or user systems other than the user system 14 according to the present invention. More specifically, as discussed below, the portable media player 12 stores proxy information for each of a number of media files from the user's media collection. In general, the proxy information represents the media files from the user's media collection. The automation function 24 operates based on either default or user defined triggers and actions. The triggers and actions may be defined for each media file represented by the proxy information, for a number of groups of media files represented by the proxy information, or generally defined for all media files represented by the proxy information. The triggers may be detecting a secondary device having a matching media file stored thereon and, optionally, docking the portable media player 12 to the user system 14. The actions may be automatically downloading matching media files from secondary systems; automatically requesting the matching media files be streamed from the secondary systems to the portable media player 12; or notifying the user of the portable media player 12 of matching media files found on secondary systems, wherein the user will select whether to download matching media files from the secondary systems or to have the matching media files streamed to the portable media player 12 from the secondary systems.

The storage unit 26 may be any digital storage device or combination of storage devices such as, but not limited to, one or more hard-disc drives; one or more removable memory devices such as Compact Flash Cards; or the like. The storage unit 26 operates to store a media database 28 and a proxy information database 30. Note that while the databases 28 and 30 are illustrated separately for clarity, the present invention is not limited thereto. The contents of the databases 28 and 30 may be stored in the storage unit 26 in any desired manner.

The media database 28 operates to store a number of media files. The media files may have been transferred to the portable media player 12 during a previous synchronization process with the user system 14 or, according to the present invention, from a secondary system during a local wireless communication session, as discussed below in detail. The media files include media content, such as songs, videos, or the like, where the media content may be encoded according to a standard such as the Moving Pictures Expert Group (MPEG) Layer 3 (MP3) standard, the Advanced Audio Coding (AAC) standard, one of the MPEG video standards, the Audio Video Interleave (AVI) standard, or the like. In addition, the media files may include metadata describing the media content of the media files. For example, for an MP3 media file, the media file may include ID3 tags including information identifying the artist, album, genre, release date, lyrics, and the like for the media content of the media file.

The proxy information database 30 operates to store proxy information transferred to the portable media player 12 during a synchronization process with the user system 14. Note that while the proxy information database 30 is referred to as a "database", the present invention is not limited thereto. The proxy information may be stored in memory or other digital storage device of the portable media player 12 in any desired manner. For example, the proxy information may be stored as one or more files. The proxy information represents a number of media files from the user's media collection. Proxy information may be stored in the proxy information database 30 for all or a portion of the media files in the user's media collection. In general, for each media file represented by proxy information, the proxy information includes an identifier, such as a Globally Unique Identifier (GUID), identifying the media content of the media file and, optionally, information identifying the encoding algorithm and one or more quality parameters for the media file. The quality parameters may vary depending on the encoding algorithm. For example, for a song encoded according to the MP3 standard, the quality parameters may include bit rate, sampling frequency, and the like.

The user system 14 may be a personal computer or the like associated with the portable media player 12. In general, the user system 14 includes a media identification client 32, a synchronization engine 34, and a storage unit 36. The media identification client 32 may be implemented in hardware, software, or a combination of hardware and software. As discussed below in more detail, the media identification client 32 provides identification parameters such as, but not limited to, fingerprints, samples, metadata, file name, directory name, and the like for each media file in the user's media collection stored in the storage unit 36 to the central system 16, wherein the central system 16 attempts to identify the media content of the media files based on the identification parameters. Once the media content of the media files is identified, the media identification client 32 generates proxy information representing each of the media files. As stated above, for each media file, the proxy information includes an identifier, such as a GUID, identifying the media content of the media file and, optionally, information identifying the encoding algorithm and one or more quality parameters for the corresponding media file.

The synchronization engine 34 may be implemented in hardware, software, or a combination of hardware and software. The synchronization engine 34 communicates with the synchronization engine 20 of the portable media player 12 when the portable media player 12 is docked to the user system 14 to effectuate a synchronization process. During the synchronization process, media files may be transferred from the user system 14 to the portable media player 12, proxy information may be transferred from the user system 14 to the portable media player 12, or both media files and proxy information may be transferred from the user system 14.

The storage unit 36 may be any digital storage device or combination of storage devices such as, but not limited to, one or more hard-disc drives, or the like. The storage unit 36 operates to store a media collection database 38 and a proxy information database 40. Note that while the databases 38 and 40 are illustrated separately for clarity, the present invention is not limited thereto. The contents of the databases 38 and 40 may be stored in the storage unit 36 in any desired manner.

The media collection database 38 operates to store a number of media files forming the user's media collection. The media files may have been obtained from an original source such as, but not limited to, a Compact Disc (CD), a Digital Video Disc (DVD), an online service such as Apple's iTunes, a Personal Video Recorder (PVR), or the like. The media files include media content, such as songs, movies, television programs, or the like, where the media content may be encoded according to a standard such as the MP3 standard, the AAC standard, one of the MPEG video standards, the AVI standard, or the like. In addition, the media files may include metadata describing the media content of the media files. For example, for an MP3 media file, the media file may include ID3 tags including information identifying the artist, album, genre, release date, lyrics, and the like for the media content of the media file.

The proxy information database 40 operates to store the proxy information generated by the media identification client 32. Note that while the proxy information database 40 is referred to as a "database", the present invention is not limited thereto. The proxy information may be stored in memory or other digital storage device associated with the user system 14 in any desired manner. For example, the proxy information may be stored as one or more files. As stated above, the proxy information database 40 stores proxy information representing each of the media files in the user's media collection. For each media file, the proxy information includes an identifier, or GUID, identifying the media content of the media file and, optionally, information identifying the encoding algorithm and one or more quality parameters for the media file.

The central system 16 operates to identify the media content of the media files in the user's media collection. In general, the central system 16 includes a media identification application 42. The media identification application 42 may be implemented in hardware, software, or a combination of hardware and software. The media identification application 42 operates to identify the media content of the media files in the user's media collection stored at the user system 14 and assign corresponding identifiers, or GUIDs, to the media files. More specifically, the user system 14 provides identification parameters such as, but not limited to, metadata, such as ID3 tags, describing the media content of the media files; fingerprints of the media content of the media files; samples of the media content of the media files; file names; directory names; or the like or any combination thereof. In response, the media identification application 42 attempts to identify the media content of the media files based on the identification parameters.

For media files having media content identified by the media identification application 42, corresponding GUIDs identifying the media content of the media files are provided to the user system 14. As discussed above, the GUIDs are used to generate the proxy information for the media files. It should be noted that while the GUIDs are the preferred method of identifying the media content of the media files in the user's media collection, the present invention is not limited thereto. Any identifier may be used.

As stated above, the network 18 is preferably a distributed, public access network, such as the Internet, wherein the user system 14 and the central system 16 are capable of interacting with and through the network 18 using various protocols such as the Transmission Control Protocol/Internet Protocol (TCP/IP), Hypertext Transport Protocol (HTTP), and File Transfer Protocol (FTP). However, those of ordinary skill in the art will appreciate that the network 18 is not limited to thereto. More specifically, the network 18 may be any type of network suitable to allow interaction between the user system 14 and the central system 16. For example, the network 18 may be a wired network, a wireless network, or a combination thereof. Further, the network 18 may include a distributed computing network, an intranet, a local-area network (LAN), and/or a wide-area network (WAN), or any combination thereof.

Figure 2:
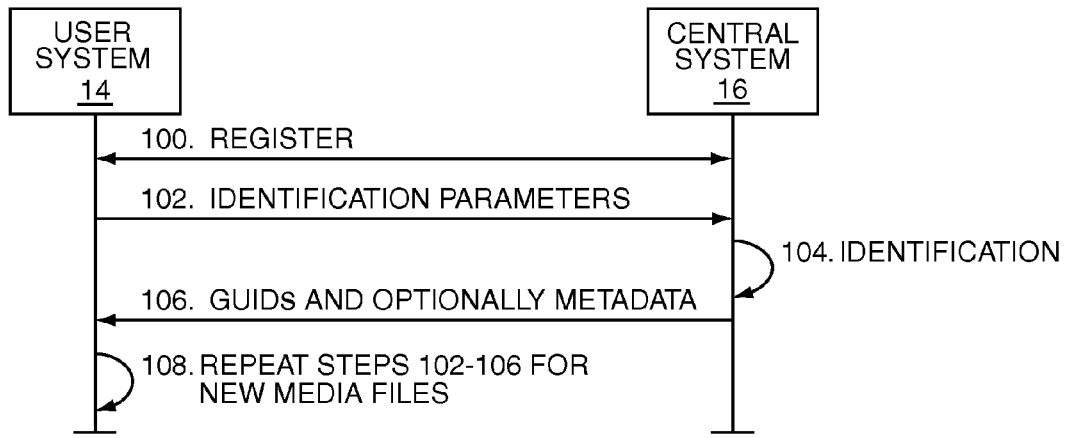
FIG. 2 illustrates the operation of the system of FIG. 1 to identify the media content of the media files forming the user's media collection.

FIG. 2 illustrates the operation of the system 10 of FIG. 1 to identify the media content of the media files in the user's media collection according to one embodiment of the present invention. In general, the process begins when the user system 14 registers with the central system 16 (step 100). During the registration process, the user associated with the user system 14 may be requested to enter information such as identification information, demographic information, and user preferences. The registration process is optional and not necessary for the present invention.

Next, the user system 14, and more specifically the media identification client 32, provides identification parameters for each of the media files in the user's media collection to the central system 16 (step 102). As discussed above, the identification parameters may include, but are not limited to, metadata, such as ID3 tags, describing the media content of the media files; fingerprints of the media content of the media files; samples of the media content of the media files; file names; directory names; or the like or any combination thereof. Prior to providing the identification parameters to the central system 16, the media identification client 32 obtains the identification parameters by processing the media files. More specifically, metadata describing the media content may be obtained from the headers of the media files. Fingerprints may be generated based on an analysis of one or more segments of the media content of each of the media files. For example, acoustic fingerprints may be generated for song files based on computing a Fast Fourier Transform (FFT) for one or more segments of the song, by determining beats-per-minute for the song, or the like. Samples of the media content of the media files may be generated by extracting one or more segments of the media content from the media files.

In response to receiving the identification parameters, the central system 16, and more specifically the media identification application 42, attempts to identify the media content of the media files based on the identification parameters (step 104). The details of the operation of the media identification application 42 are not central to the present invention. However, in general, identification may be performed by comparing the identification parameters of the media files to like identification parameters of reference media files, wherein the reference media files or the identification parameters for the reference media files may be stored by or in association with the central system 16. For example, the media identification application 42 may compare the fingerprints of the media files from the user's media collection to fingerprints of the reference media files. As a result, if the media content of the media file corresponds to the media content of one of the reference media files, the fingerprints will substantially match such that the media content of the media file is identified as the media content of the one of the reference media files. Likewise, samples of the media files may be used to generate fingerprints for the media files, wherein the fingerprints may be used to identify the media content of the media files. In addition or alternatively, metadata, such as ID3 tags, file names, directory names, and the like may be used to identify the media content of the media files as the media content of ones of the reference media files.

For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

Once the media content of the media files in the user's media collection is identified, the GUIDs for the media files and optionally metadata for the media files may then be provided to the user system 14 from the central system 16 (step 106). It should be noted that the media identification application 42 may be unable to identify the media content of some of the media files in the user's media collection, as will be apparent to one of ordinary skill in the art. Once the GUIDs for the media files are received by the media identification client 32 at the user system 14, the media identification client 32 generates the proxy information for each of the media files. For each media file, the proxy information includes the GUID or other identifier identifying the media content of the corresponding media file and, optionally, information identifying the encoding algorithm and one or more quality parameters for the corresponding media file. Note that the media files having unidentified media content may optionally be ignored such that proxy information is only generated for the media files having identified media content.

If metadata is received by the user system 14 in step 106, the metadata may be stored, for example, in the headers of the associated media files or used to correct the metadata already stored for the associated media files. For example, if a song is an MP3 file, the metadata may be used to create or correct the ID3 tags stored in the MP3 file. In addition, the metadata may be used to generate new file names for the media files or the like as will be apparent to one of ordinary skill in the art upon reading this disclosure. At this point, steps 102-106 may be repeated when new media files are added to the user's media collection or when desired by the user (step 108).

Figure 3:
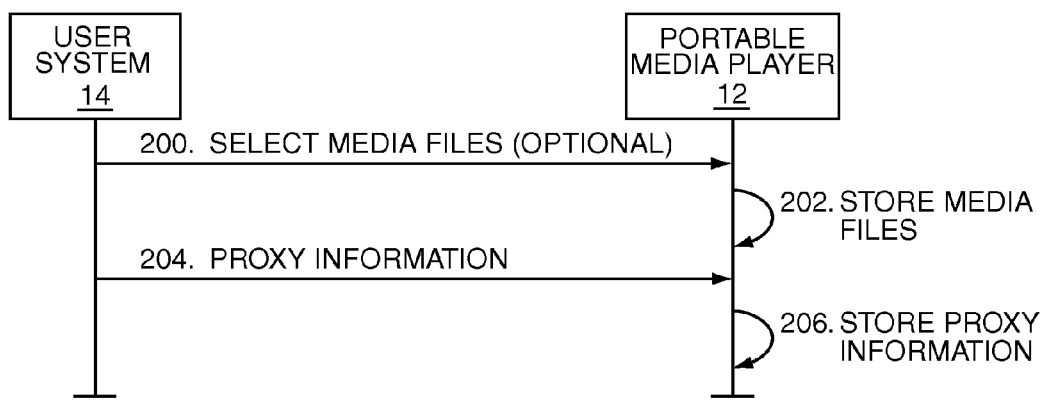
FIG. 3 illustrates an exemplary synchronization process between the portable media player and associated user system wherein proxy information representing media files from the user's media collection are provided to the portable media player according to one embodiment of the present invention.

FIG. 3 illustrates an exemplary synchronization process between the portable media player 12 and the user system 14 during which proxy information is provided to the portable media player 12 according to one embodiment of the present invention. During the synchronization process, the portable media player 12 is docked to the user system 14 via either a wired or wireless connection. Optionally, select media files from the user's media collection may be transferred to the portable media player 12 from the user system 14 (step 200). The select media files may be selected by the user associated with the user system 14 and the portable media player 12. The select media files may alternatively or additionally be media files purchased or otherwise obtained since a previous synchronization process. Once received by the portable media player 12, the media files are stored in the media database 28 (step 202).

According to the present invention, the user system 14 provides proxy information representing the media files in the user's media collection, or a subset thereof, to the portable media player 12 (step 204). If the portable media player 12 has sufficient storage space in the storage unit 26, the proxy information representing all of the media files in the user's media collection, or all of the media files in the user's media collection other than the media files already stored in the media database 28 of the portable media player 12, may be transferred to the portable media player 12. Alternatively, the proxy information transferred to the portable media player 12 may be the proxy information representing a subset of the media files in the user's media collection. For example, the proxy information may be the proxy information representing media files selected by the user. As another example, the proxy information may be the proxy information representing media files selected by the user system 14 based on a play history of the portable media player 12, a play history of the user system 14, user preferences defined by the user associated with the portable media player 12 and the user system 14, or the like or any combination thereof. As yet another example, the proxy information may be the proxy information representing media files selected by the user system 14 at random. Once received by the portable media player 12, the proxy information is stored in the proxy information database 30 (step 206).

Figure 4:
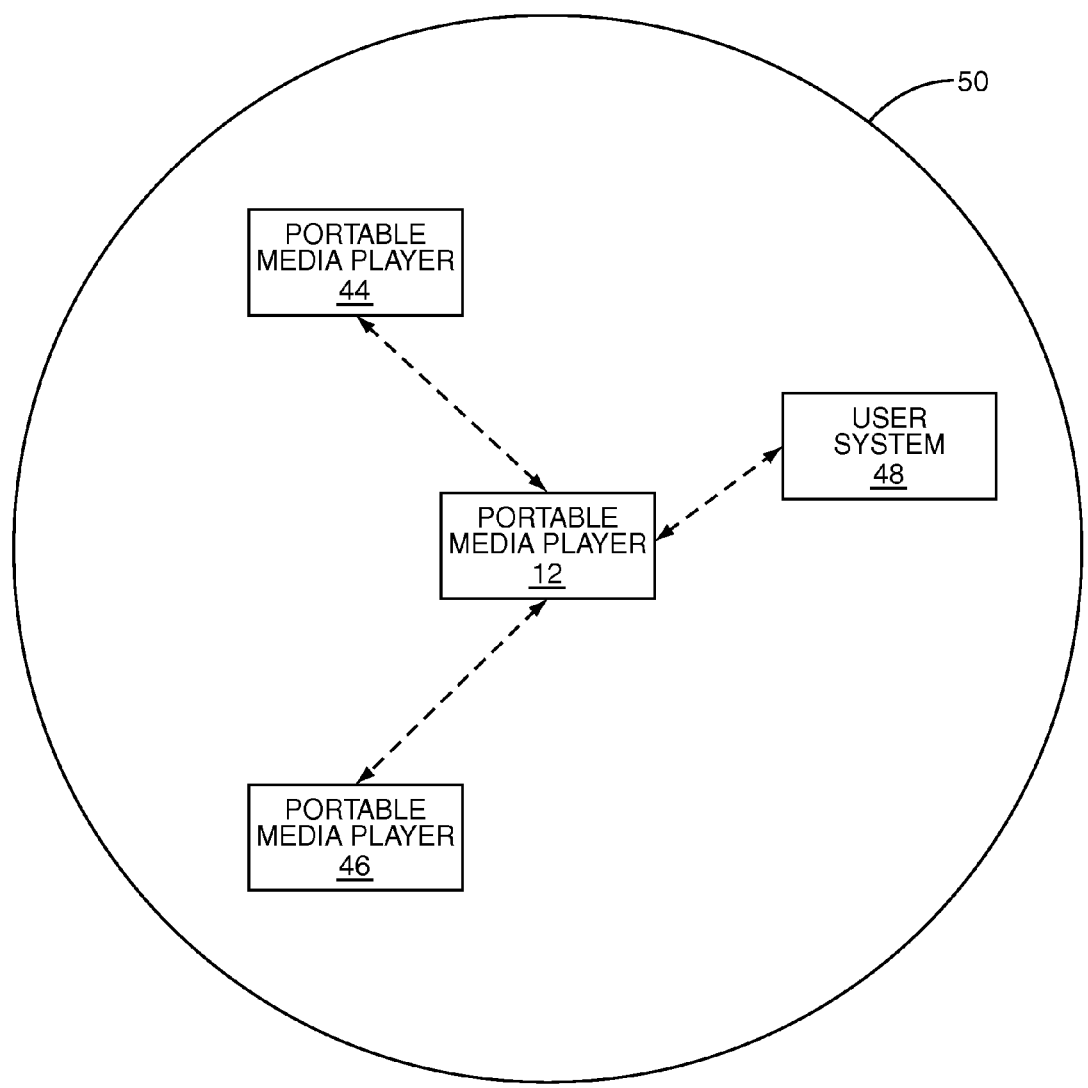
FIG. 4 illustrates the operation of the portable media player to establish local wireless communication with secondary devices within a local wireless coverage area of the portable media player according to one embodiment of the present invention.

According to the present invention, the proxy information stored by the portable media player 12 is used by the portable media player 12 to obtain corresponding media content from secondary systems, such as other portable media players or other user systems, via local wireless communication. More specifically, as illustrated in FIG. 4, a number of secondary systems 44-48 may be within a local wireless coverage area 50 defined by a local wireless communication range of the portable media player 12 while the portable media player 12 is undocked from the user system 14. In this example, the secondary systems 44-48 are more specifically portable media players 44 and 46 and a user system 48. Preferably, the portable media players 44 and 46 are similar to the portable media player 12, and the user system 48 is similar to the user system 14.

In operation, the portable media player 12, and more specifically, the networking function 22, operates to scan the local wireless coverage area 50 of the portable media player 12 for secondary systems, which in this example are the portable media players 44 and 46 and the user system 48. The scan of the local wireless coverage area 50 may be performed periodically or upon request by the user of the portable media player 12. Once the secondary systems 44-48 are detected, communication between the portable media player 12 and the secondary systems 44-48 is established. The details of establishing communication vary depending on the local wireless communication standard used and will be apparent to one of ordinary skill in the art upon reading this disclosure.

Once communication is established, the portable media player 12 provides the proxy information, or a subset thereof, stored in the proxy information database 30 to the secondary systems 44-48. In response, the secondary systems 44-48 each determine whether media files having media content matching the media content identified by the proxy information are stored thereon. The secondary systems 44-48 then provide notifications to the portable media player 12 to notify the portable media player 12 of media files stored on the secondary systems 44-48 matching the proxy information. In one embodiment, the portable media player 12 may then automatically download the matching media files from the secondary systems 44-48. In another embodiment, the matching media files may be streamed to the portable media player 12 from one of the secondary systems 44-48 such that the media content of the media files may be played by the portable media player 12 while the matching media files are delivered to the portable media player 12. When streaming is desired, scheduling may be implemented such that, for example, only one media file is streamed to the portable media player 12 at a time. In yet another embodiment, the portable media player 12 may notify the user of the portable media player 12 of the matching media files, wherein the user can select whether to download the matching media files, stream the matching media files, or ignore the matching media files.

Figure 5:
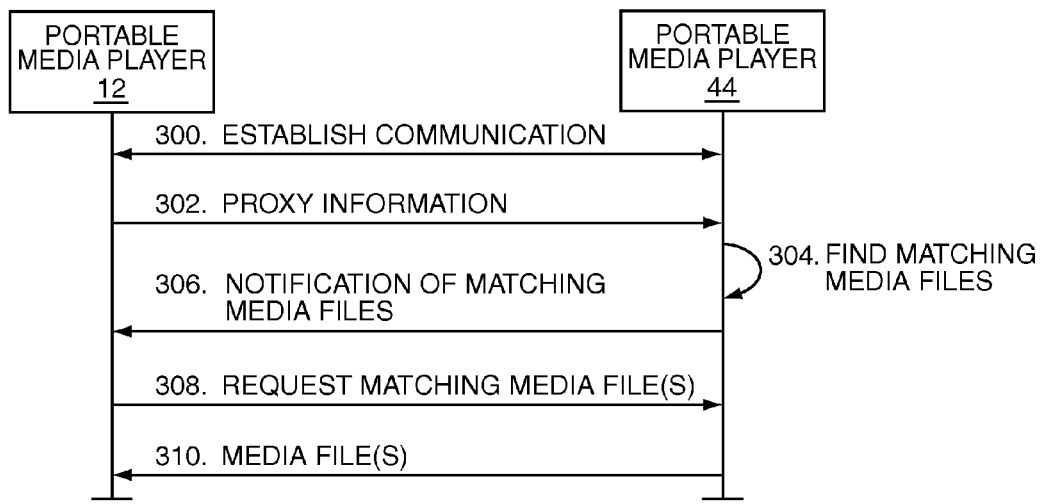
FIG. 5 illustrates the interaction of the portable media player and a secondary system, such as another portable media player, to obtain media files having media content corresponding to media content in the user's media collection using the proxy information according to one embodiment of the present invention.

FIG. 5 is a more detailed illustration of the interaction of the portable media players 12 and 44 of FIG. 4 according to one embodiment of the present invention. Note that while this discussion focuses on the interaction with the portable media player 44, the discussion is equally applicable to any of the secondary systems 44-48 of FIG. 4. In general, the portable media players 12 and 44 first interact to establish local wireless communication (step 300). The portable media player 12 then provides proxy information representing one or more media files in the user's media collection to the portable media player 44 (step 302). The proxy information provided to the portable media player 44 may be the proxy information representing media files requested by the user of the portable media player 12, all of the proxy information stored in the proxy information database 30, all of the proxy information stored in the proxy information database 30 other than the proxy information representing the media files stored in the media database 28 of the portable media player 12, or a subset of the proxy information representing media files selected by the portable media player 12 based on criteria such as, but not limited to, a play history of the portable media player 12.

In response, the portable media player 44 processes the proxy information to find matching media files stored on the portable media player 44 (step 304). A matching media file is a media file stored by the portable media player 44 having media content matching the media content identified by the proxy information representing one of the media files in the user's media collection. More specifically, in one embodiment, a matching media file may be a media file having a GUID matching the GUID included in the proxy information representing one of the media files in the user's media collection. In addition, in order to prevent the user from obtaining a higher quality version of the media content than the user has in his or her media collection, a matching media file may be limited to a media file having a matching GUID and a quality that is essentially equivalent to or lesser than the quality identified by the quality parameters in the proxy information. Optionally, the matching media file may be required to be encoding with one of a number of encoding algorithms known to the portable media player 12. For example, the portable media player 12 may not be capable of playing audio content encoded in the AAC format. As such, a media file encoded in the AAC format that is otherwise a matching media file would not be identified as a matching media file since the portable media player 12 is unable to play the media file.

It should be noted that while the discussion herein focuses on GUIDs, the proxy information may alternatively include fingerprints identifying the media content, samples of the media content, metadata describing the media content, or any other information identifying the media content or any combination thereof. The portable media player 44 may then find matching media files based on this information.

In another embodiment, for each media file represented by the proxy information, the proxy information includes information identifying the encoding algorithm and one or more quality parameters. As such, in order to match the proxy information for one of the media files in the user's media collection, a media file stored on the portable media player 44 may be required to be encoded with the encoding algorithm identified in the proxy information and have quality parameters essentially equivalent to or lesser than the quality parameters identified in the proxy information.

In another embodiment, the portable media player 44 may have access to a number of encoding algorithms. As such, a matching media file may be required to only have matching media content. The matching media file may be of higher or lower quality than the corresponding media file in the user's media collection. When the matching media file is requested by the portable media player 12, the portable media player 44 may then generate a copy of the matching media file in a desired format and quality using the encoding algorithm, and optionally the quality parameters, identified in the proxy information.

Once the matching media files on the portable media player 44 are identified, the portable media player 44 generates and provides a notification to the portable media player 12 (step 306). The notification notifies the portable media player 12 of the matching media files stored by the portable media player 44. In one embodiment, the notification includes the GUIDs of the matching media files.

In this embodiment, the automation function 24 (FIG. 1) of the portable media player 12 is configured such that matching media files are automatically obtained from the portable media player 44 in response to the notification. Thus, the portable media player 12 provides a request for the matching media files to the portable media player 44 (step 308). In response, the matching media files are provided to the portable media player 12 (step 310). Alternatively, as discussed above, copies of the matching media files generated by the portable media player 44 in the desired format and quality may be provided to the portable media player 12.

Step 310 may vary depending on the particular embodiment. In one embodiment, the matching media files are automatically streamed from the portable media player 44 to the portable media player 12 such that the matching media files are played by the portable media player 12 as they are delivered. Note that in this embodiment, the portable media player 12 may implement a scheduling algorithm to schedule streaming of the matching media files. For example, the portable media player 12 may schedule the streaming of the matching media files such that only one of the matching media files is streamed to the portable media player 12 at a time.

In another embodiment, the portable media player 12, and specifically the automation function 24, may be configured to automatically download the matching media files upon receiving the notification in step 306. As such, steps 308 and 310 operate to automatically download the matching media files from the portable media player 44 to the portable media player 12. The downloaded media files are then stored in the media database 28 of the portable media player 12 and may be played when desired by the user.

Figure 6:
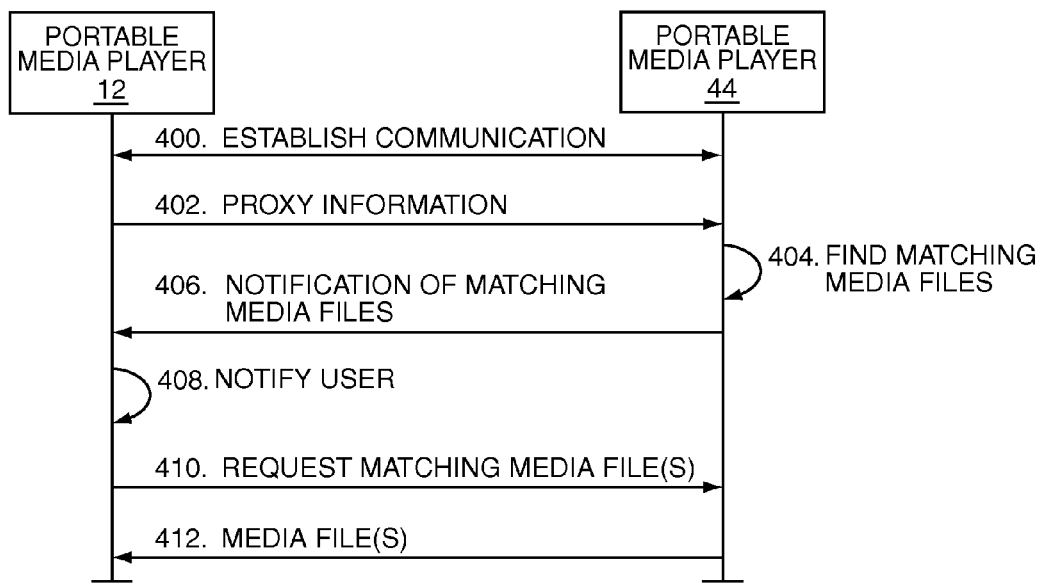
FIG. 6 illustrates the interaction of the portable media player and a secondary system, such as another portable media player, to obtain media files having media content corresponding to media content in the user's media collection using the proxy information according to another embodiment of the present invention.

FIG. 6 is similar to FIG. 5 and illustrates the interaction of the portable media players 12 and 44 of FIG. 4 according to another embodiment of the present invention. In this embodiment, the portable media player 12, and more specifically the automation function 24, is configured to notify the user of the portable media player 12 of the matching media files found on the portable media player 44, wherein the user determines whether to download, stream, or ignore the matching media files. Note that while this discussion focuses on the interaction with the portable media player 44, the discussion is equally applicable to any of the secondary systems 44-48 of FIG. 4.

First, the portable media players 12 and 44 interact to establish local wireless communication (step 400). The portable media player 12 then provides proxy information representing one or more media files in the user's media collection to the portable media player 44 (step 402). The proxy information provided to the portable media player 44 may be proxy information representing media files requested by the user of the portable media player 12, all of the proxy information stored in the proxy information database 30, all of the proxy information stored in the proxy information database 30 other than the proxy information representing the media files stored in the media database 28 of the portable media player 12, or a subset of the proxy information representing media files selected by the portable media player 12 based on criteria such as, but not limited to, a play history of the portable media player 12.

In response, the portable media player 44 processes the proxy information to find matching media files stored on the portable media player 44 (step 404). Once the matching media files on the portable media player 44 are identified, the portable media player 44 generates and provides a notification to the portable media player 12 (step 406). The notification notifies the portable media player 12 of the matching media files stored by the portable media player 44. In one embodiment, the notification includes the GUIDs of the matching media files.

In this embodiment, automation function 24 of the portable media player 12 is configured to notify the user of the portable media player 12 of the matching media files (step 408). The manner in which the user is notified of the matching media files may take numerous forms, as will be apparent to one of ordinary skill in the art upon reading this disclosure. For example, an audio or visual alert may be provided to the user to notify the user that matching media files have been found. The user may then view information identifying the media content of the matching media files, such as the titles of the media content of the matching media files, via a user interface of the portable media player 12. In another embodiment, steps 400-406 may be performed as a background operation, and information identifying the matching media files may be presented to the user via a graphical user interface of the portable media player 12 along with information identifying the media files stored in the media database 28 of the portable media player 12. An exemplary graphical user interface for notifying the user of matching media files is illustrated in FIGS. 7A-7D, which are discussed below.

Upon notifying the user of the matching media files, the user may select one or more of the matching media files to obtain from the portable media player 44. In one embodiment, the user selects one or more of the matching media files to stream to the portable media player 12. The selected media files may then be requested from the portable media player 44 (step 410). In response, the portable media player 44 streams the selected media files to the portable media player 12 (step 412). Note that when the selected media files are streamed to the portable media player 12, the selected media files are played as they are delivered. Thus, if more than one matching media file is selected, the delivery of the matching media files may be scheduled such that, for example, only one of the matching media files is streamed to the portable media player 12 at a time. Further, when streamed, the selected media files may or may not be permanently stored at the portable media player 12.

In another embodiment, the user selects one or more of the matching media files to download to the portable media player 12. The selected media files may then be requested from the portable media player 44 (step 410). In response, the portable media player 44 downloads the selected media files to the portable media player 12, where the downloaded media files are stored in the media database 28 of the portable media player 12 (step 412). Alternatively, as discussed above, the portable media player 44 may first generate copies of the selected media files in the desired format and quality and then download the copies of the matching media files to the portable media player 12 in step 412. Once stored, the downloaded media files may be selected and played by the portable media player 12.

Figure 7A:
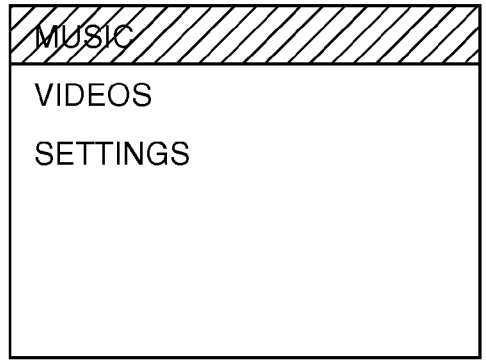
FIGS. 7A-7D illustrate an exemplary graphical user interface for the portable media player of FIG. 1 according to one embodiment of the present invention.

FIGS. 7A-7D illustrate an exemplary graphical user interface for the portable media player 12 for notifying the user of matching media files found on secondary systems, such as the portable media player 44, as discussed above with respect to FIG. 6. As illustrated in FIG. 7A, the user may first select whether he or she desires to play music, play videos, or adjust the settings of the portable media player 12. Note that the settings may include the settings of the automation function 24 (FIG. 1). The settings of the automation function 24 may enable the user to define settings for each media file represented by the proxy information, settings for each of a number of groups of media files represented by the proxy information, or general settings to be applied to all media files represented by the proxy information. The automation function settings define whether the media files matching the proxy information are to be automatically downloaded or streamed from the secondary system or whether the user is to be notified of the matching media files. In this example, the automation function 24 is configured to notify the user of matching media files. However, the same or a similar graphical user interface may be used to enable the user to play media files automatically downloaded to the portable media player 12 from the secondary devices 44-48.

Figure 7B:
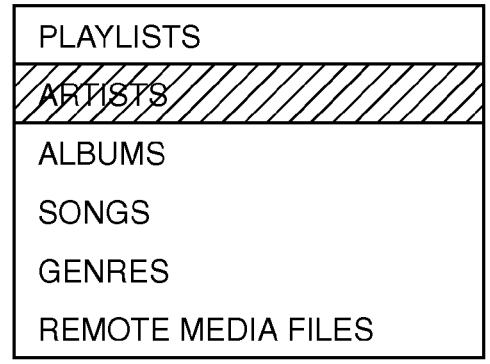

In this example, the user has selected MUSIC. Thus, as illustrated in FIG. 7B, the user may then select whether he or she desires to view a list of play lists, artists, albums, songs, genres, or remote media files. The remote media files are all matching music files found on the secondary systems 44-48 currently within the local wireless coverage area 50 (FIG. 4) of the portable media player 12. If the user selects playlists, a number of playlists generated by the user may then be presented to the user. If the user selects artists, a list of artists for which songs are stored on the portable media player 12 or for which songs have been found on one or more of the secondary systems 44-48 may then be presented to the user. In a similar fashion, lists of albums, songs, genres, and remote media files may be presented to the user if selected.

Figure 7C:
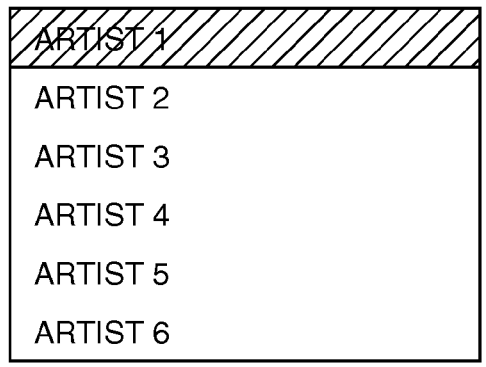
Figure 7D:
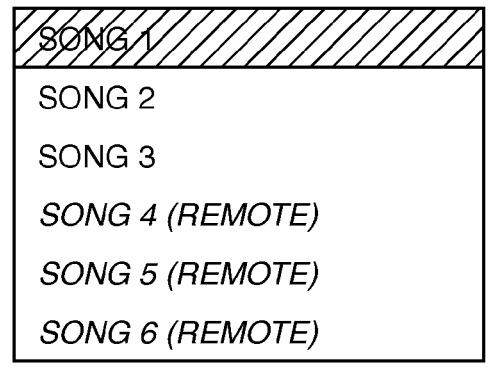

In this example, the user selects ARTISTS. As a result, a list of artists is presented to the user, as illustrated in FIG. 7C. The list of artists includes artists for which songs are available. Songs are available if corresponding media files are stored on the portable media player 12 or have been found on the secondary systems 44-48. The user may then select an artist to view a list of songs available for the selected artist. In this example, the user has selected ARTIST 1. As a result, a list of available songs for the selected artist is presented to the user, as illustrated in FIG. 7D. Again, the available songs include songs stored in the media database 28 of the portable media player 12 and remote media files found on the secondary systems 44-48. In this example, there are three remote media files for the selected artist, and the remote media files are identified by being displayed in italics. The remote media files may additionally or alternatively be identified using a different font, different color, some other indicator, or any combination thereof. In this example, the remote media files are additionally identified by displaying "REMOTE" beside the song titles.

The remote media files may be selected by the user and, in response, obtained from the corresponding secondary system 44-48. The user may select one or more of the remote media files such that they are streamed to the portable media player 12 or such that they are downloaded to the portable media player 12, as described above. Note that the remote files may also be selected indirectly by the user. For example, the user may select ARTIST 1 and instruct the portable media player 12 to play all available songs including the remote media files for ARTIST 1. In response, the portable media player 12 may either download the remote media files from the secondary systems 44-48 or have the remote media files streamed to the portable media player 12 for playback.

In a similar fashion, the user may be notified of matching video files found on the secondary systems 44-48. Further, in addition to the graphical user interface illustrated in FIGS. 7A-7D, audible alerts may be provided to the user to notify the user that matching media files have been found. In response to the audible alert, the user may interact with the portable media player 12 using, for example, the graphical user interface of FIGS. 7A-7D to select desired ones of the matching media files to either stream or download from the secondary systems 44-48.

Figure 8:
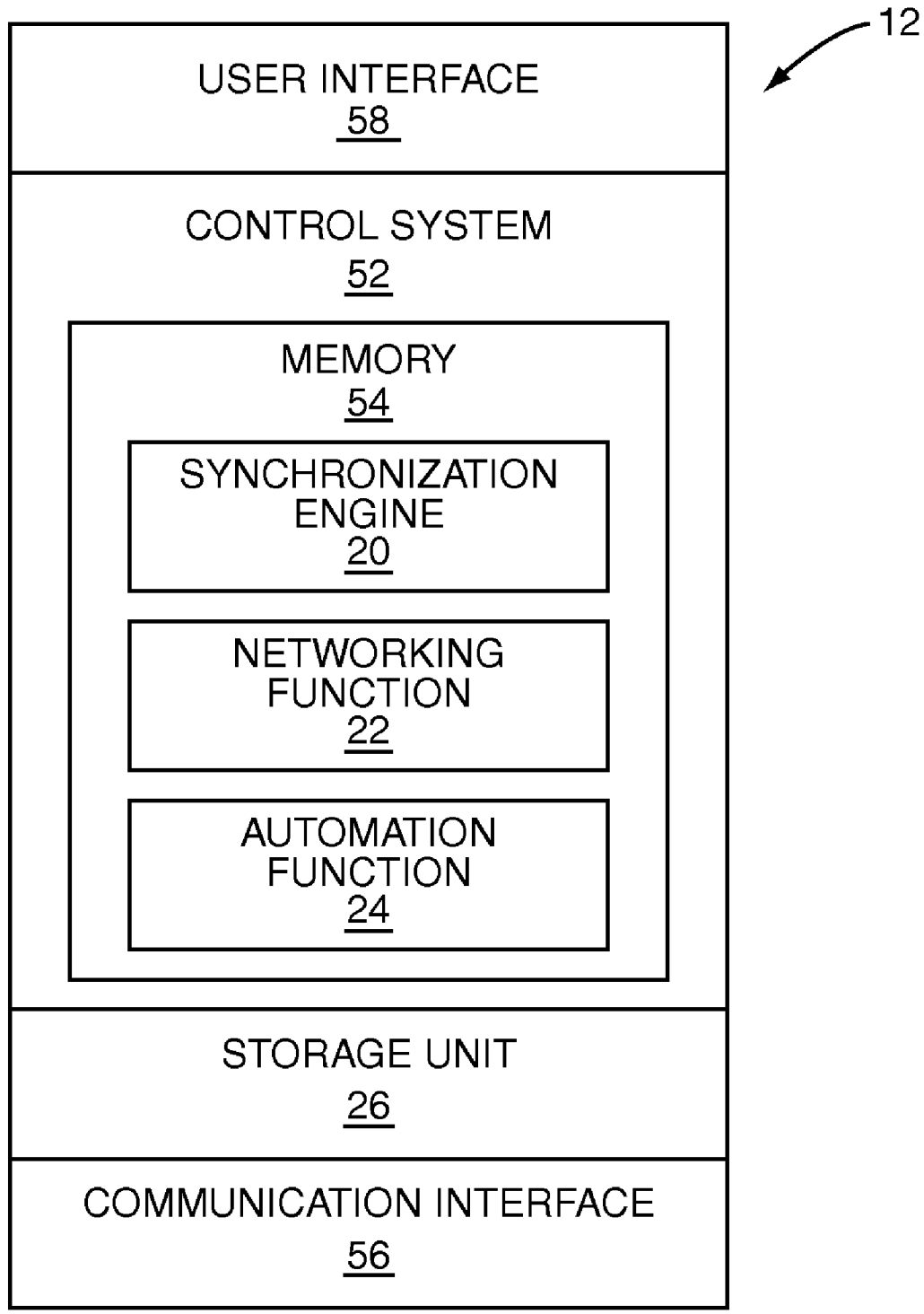
FIG. 8 is a block diagram illustrating an exemplary embodiment of the portable media player of FIG. 1 according to one embodiment of the present invention.

FIG. 8 is a block diagram of an exemplary embodiment of the portable media player 12 of FIG. 1. In general, the portable media player 12 includes a control system 52 having associated memory 54. The memory 54 operates to store software instructing the portable media player 12 to operate according to the present invention. In this example, the synchronization engine 20, the network function 22, and the automation function 24 are at least partially implemented in software and stored in the memory 54. The portable media player 12 also includes the storage unit 26, which may be, for example, a hard-disc drive or the like. The databases 28 and 30 (FIG. 1) may be implemented in the storage unit 26. Alternatively, the databases 28 and 30, or a portion thereof, may be implemented in the memory 54. The portable media player 12 also includes a communication interface 56. The communication interface 56 enables communication with the user system 14 (FIG. 1) via a wireless or wired interface. In addition, the communication interface 56 includes a local wireless interface enabling local wireless communication with the secondary devices 44-48 (FIG. 4) within the local wireless coverage area 50 of the portable media player 12. Note that a single local wireless interface may be used for both docking the portable media player 12 to the user system 14 and establishing local wireless communication with the secondary devices 44-48 when undocked from the user system 14. The portable media player 12 also includes a user interface 58, which may include a display, speakers, input buttons or dials, or the like.

Figure 9:
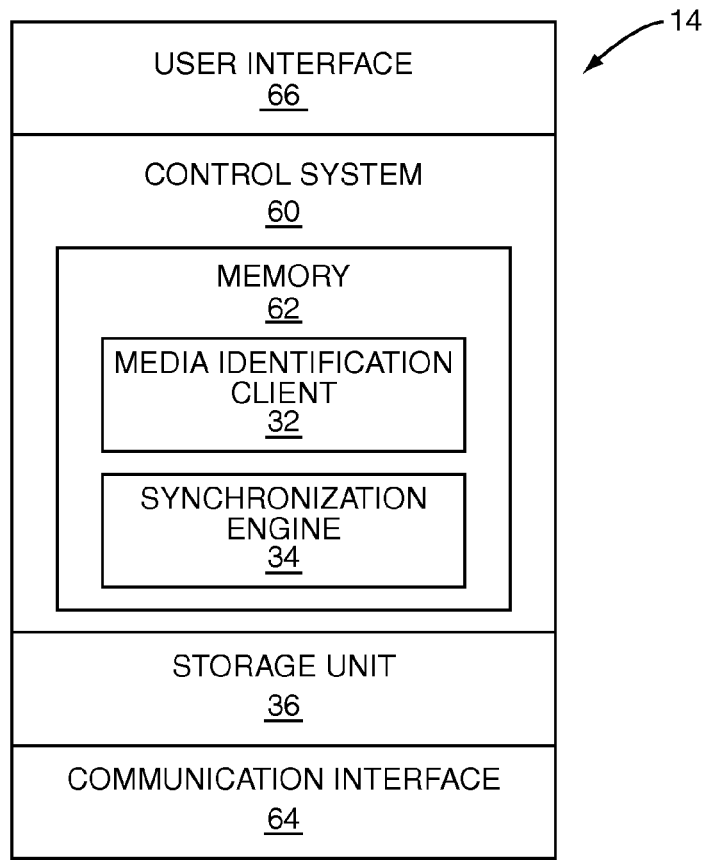
FIG. 9 is a block diagram illustrating an exemplary embodiment of the associated user system of FIG. 1 according to one embodiment of the present invention.

FIG. 9 is a block diagram of an exemplary embodiment of the user system 14 of FIG. 1. In general, the user system 14 includes a control system 60 having associated memory 62. The memory 62 operates to store software instructing the user system 14 to operate according to the present invention. In this example, the media identification client 32 and the synchronization engine 34 are at least partially implemented in software and stored in the memory 62. The user system 14 also includes the storage unit 36, which may be, for example, a hard-disc drive or the like. The databases 38 and 40 (FIG. 1) may be implemented in the storage unit 36. Alternatively, the databases 38 and 40, or a portion thereof, may be implemented in the memory 62. The user system 14 also includes a communication interface 64. The communication interface 64 may include a first interface communicatively coupling the user system 14 to the network 18 (FIG. 1) and a second interface providing either wireless or wired communication with the portable media player 12 (FIG. 1) during a docking, or synchronization, process. In addition, the user system 14 includes a user interface 66, which may include a display, speakers, one or more input devices, or the like.

Figure 10:
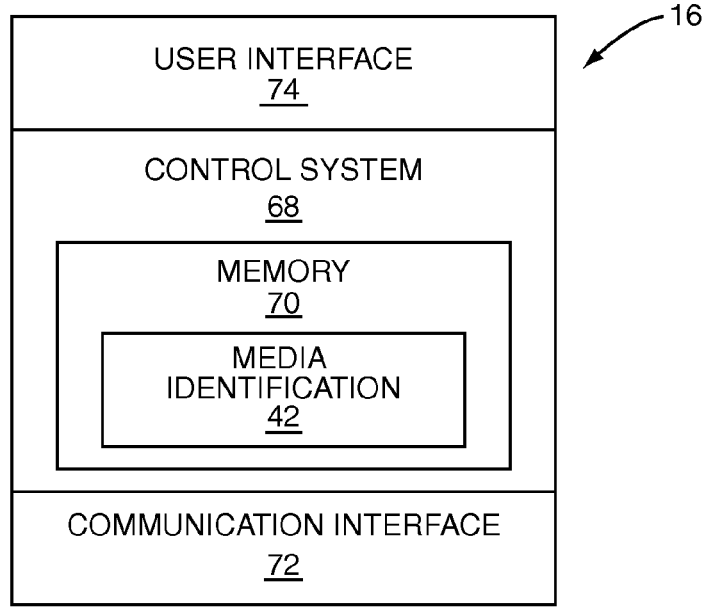
FIG. 10 is a block diagram illustrating an exemplary embodiment of the central system of FIG. 1 according to one embodiment of the present invention.

FIG. 10 is a block diagram of an exemplary embodiment of the central system 16 of FIG. 1. In general, the central system 16 includes a control system 68 having associated memory 70. The memory 70 operates to store software instructing the central system 16 to operate according to the present invention. In this example, at least a portion of the media identification application 42 is implemented in software and is stored in the memory 70. The central system 16 also includes a communication interface 72 communicatively coupling the central system 16 to the network 18 (FIG. 1). In addition, the central system 16 includes a user interface 74, which may include a display, speakers, one or more input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A portable media player comprising:
    a local wireless communication interface adapted to communicatively couple the portable media player to a secondary system within a local wireless coverage area of the portable media player;
    a digital storage device adapted to store a copy of one or more media files from a media collection of a user of the portable media player and proxy information representing each of a plurality of media files from the media collection, wherein the media collection of the user is hosted by an associated user system and the plurality of media files represented by the proxy information comprises media files from the media collection for which copies are not stored in the digital storage device of the portable media player; and
    a control system associated with the local wireless communication interface and the digital storage device and adapted to:
        provide the proxy information to the secondary system for one of a group consisting of: at least one of the plurality of media files programmatically selected based on at least one criterion and all of the plurality of media files;
        receive a notification from the secondary system of a matching media file stored by the secondary system, the matching media file identified by the secondary system based on the proxy information provided to the secondary system;
        perform an action in response to the notification from the secondary system; and
    wherein the plurality of media files represented by the proxy information is limited to media files from the media collection such that access to media files by the portable media player using the proxy information is restricted to the plurality of media files from the media collection represented by the proxy information.

2. The portable media player of claim 1 wherein the proxy information representing the plurality of media files comprises information identifying media content of the plurality of media files.

3. The portable media player of claim 2 wherein the matching media file is a media file stored by the secondary system having media content corresponding to the media content identified by the proxy information for the at least one of the plurality of media files.

4. The portable media player of claim 1 wherein the local wireless communication interface is further adapted to communicatively couple the portable media player to the associated user system storing the media collection during a docking process, and the control system is further adapted to receive the proxy information for each of the plurality of media files from the associated user system during the docking process and store the proxy information in the digital storage device.

5. The portable media player of claim 1 further comprising a second communication interface adapted to communicatively couple the portable media player to the associated user system storing the media collection during a docking process, and the control system is further adapted to receive the proxy information for each of the plurality of media files from the associated user system during the docking process and store the proxy information for each of the plurality of media files in the digital storage device.

6. The portable media player of claim 1 wherein the proxy information provided to the secondary system comprises proxy information for the at least one of the plurality of media files programmatically selected based on the at least one criterion, and the control system is further adapted to programmatically select the at least one of the plurality of media files based on the at least one criterion.

7. The portable media player of claim 6 wherein the at least one criterion comprises a play history of the portable media player.

8. The portable media player of claim 1 wherein the action taken by the control system in response to the notification from the secondary system is automatically downloading the matching media file from the secondary system.

9. The portable media player of claim 1 wherein the action taken by the control system in response to the notification from the secondary system is providing a request to the secondary system, wherein, in response, the matching media file is streamed from the secondary system to the portable media player.

10. The portable media player of claim 1 wherein the action taken in response to the notification from the secondary system is notifying the user of the portable media player of the matching media file; and
    the control system is further adapted to obtain the matching media file in response to a selection from the user.

11. The portable media player of claim 10 wherein in order to obtain the matching media file, the control system is further adapted to download the matching media file from the secondary system.

12. The portable media player of claim 10 wherein in order to obtain the matching media file, the control system is further adapted to request the matching media file from the secondary system and receive the matching media file from the secondary system as streaming content.

13. The portable media player of claim 1 wherein the control system is further adapted to detect the secondary system within the local wireless coverage area of the portable media player, and establish communication with the secondary system.

14. The portable media player of claim 1 wherein the secondary system is another portable media player.

15. The portable media player of claim 1 wherein the control system is further adapted to:
    detect the secondary system within the local wireless coverage area of the portable media player; and
    automatically provide the proxy information representing all of the plurality of media files to the secondary system in response to detecting the secondary system within the local wireless coverage area of the portable media player.

16. The portable media player of claim 1 wherein the control system is further adapted to:
    detect the secondary system within the local wireless coverage area of the portable media player; and
    automatically provide the proxy information representing at least one of the plurality of media files programmatically selected based on the at least one criterion to the secondary system in response to detecting the secondary system within the local wireless coverage area of the portable media player.

17. The portable media player of claim 1 wherein an action to be taken by the control system in response to a notification of a matching media file at the secondary system is defined for the plurality of media files represented by the proxy information.

18. The portable media player of claim 1 wherein an action to be taken by the control system in response to a notification of a matching media file at the secondary system is independently defined for each of at least two subsets of the plurality of media files represented by the proxy information.

19. The portable media player of claim 1 wherein an action to be taken by the control system in response to a notification of a matching media file at the secondary system is independently defined for each of the plurality of media files represented by the proxy information.

20. A method of operation of a portable media player comprising:
   storing, at the portable media player, a copy of one or more media files from a media collection of a user of the portable media player;
   storing, at the portable media player, proxy information representing a plurality of media files in the media collection of the user of the portable media player, wherein the media collection is hosted by an associated user system and the plurality of media files from the media collection and comprises media files from the media collection for which copies are not stored at the portable media player and wherein the plurality of media files represented by the proxy information is limited to media files from the media collection such that access to media files by the portable media player using the proxy information is restricted to the plurality of media files from the media collection represented by the proxy information;
   establishing communication with a secondary system within a local wireless coverage area of the portable media player via a local wireless communication interface;
   providing the proxy information to the secondary system for one of a group consisting of: at least one of the plurality of media files programmatically selected based on at least one criterion and all of the plurality of media files;
   receiving a notification from the secondary system of a matching media file stored by the secondary system, the matching media file identified by the secondary system based on the proxy information provided to the secondary system; and
   performing an action in response to the notification from the secondary system.

21. A portable media player comprising:
   a local wireless communication interface adapted to communicatively couple the portable media player to a secondary system within a local wireless coverage area of the portable media player;
   a digital storage device adapted to store a copy of one or more media files from a media collection of a user of the portable media player and proxy information representing each of a plurality of media files from the media collection, wherein the media collection of the user is hosted by an associated user system and the plurality of media files represented by the proxy information comprises media files from the media collection for which copies are not stored in the digital storage device and, for each media file from the plurality of media files, the proxy information representing the media file comprises information identifying the media file and at least one of a group consisting of: information identifying at least one desired encoding format and information identifying at least one quality parameter of the media file; and
   a control system associated with the local wireless communication interface and the digital storage device and adapted to:
      provide the proxy information for at least one of the plurality of media files to the secondary system;
      receive a notification from the secondary system of a matching media file stored by the secondary system, the matching media file identified by the secondary system based on the proxy information for the at least one of the plurality of media files;
      obtain the matching media file from the secondary system: and
   wherein the plurality of media files represented by the proxy information is limited to media files from the media collection such that access to media files by the portable media player using the proxy information is restricted to the plurality of media files from the media collection represented by the proxy information.

22. The portable media player of claim 21 wherein the proxy information comprises the at least one quality parameter, and a quality of the matching media file obtained from the secondary system is no greater than that identified by the at least one quality parameter.

23. The portable media player of claim 21 wherein the proxy information comprises the information identifying the at least one desired encoding format, and the matching media file obtained from the secondary system is encoded in one of the at least one desired encoding format.

24. The portable media player of claim 23 wherein the at least one desired encoding format is one of a group consisting of: an encoding format of the media file from the plurality of media files represented by the proxy information and at least one encoding format playable by the portable media player.

* * * * *

UNITED STATES PATENT AND TRADEMARK OFFICE
CERTIFICATE OF CORRECTION

PATENT NO.      : 8,185,579 B2                                Page 1 of 1
APPLICATION NO. : 12/233871
DATED           : May 22, 2012
INVENTOR(S)     : Hugh Svendsen It is certified that error appears in the above-identified patent and that said Letters Patent is hereby corrected as shown below:

Title Page, Item (57)

In the abstract, replace "In general," with --In general--.
In the abstract, replace "In response," with --In response--.

In column 18, at lines 31-32 in claim 21, replace "system:" with --system;--.

Signed and Sealed this
Twentieth Day of November, 2012

David J. Kappos
*Director of the United States Patent and Trademark Office*